United States Patent
Ramsteiner

(10) Patent No.: US 11,914,387 B2
(45) Date of Patent: Feb. 27, 2024

(54) IMAGING DEVICE

(71) Applicant: Robert Bosch GmbH, Stuttgart (DE)

(72) Inventor: Ingo Ramsteiner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 766 days.

(21) Appl. No.: 17/026,743

(22) Filed: Sep. 21, 2020

(65) Prior Publication Data

US 2021/0096578 A1 Apr. 1, 2021

(30) Foreign Application Priority Data

Sep. 27, 2019 (DE) .......................... 102019214913.8

(51) Int. Cl.
| | |
|---|---|
| G05D 1/02 | (2020.01) |
| G01S 17/894 | (2020.01) |
| G02B 27/14 | (2006.01) |
| G01S 7/481 | (2006.01) |
| H04N 23/56 | (2023.01) |
| G05D 1/00 | (2006.01) |

(52) U.S. Cl.
CPC .......... *G05D 1/0231* (2013.01); *G01S 7/4815* (2013.01); *G01S 7/4817* (2013.01); *G01S 17/894* (2020.01); *G02B 27/141* (2013.01); *G02B 27/142* (2013.01); *G02B 27/149* (2013.01); *H04N 23/56* (2023.01)

(58) Field of Classification Search
CPC ... G02B 27/141; G01S 7/4817; G01S 17/931; G01S 7/4816; H04B 7/18504; A61B 1/00114; G03H 1/2205; G05D 1/0248; G05D 1/02; G01J 3/0208; H04N 1/1911
See application file for complete search history.

(56) References Cited

U.S. PATENT DOCUMENTS

| | | | | |
|---|---|---|---|---|
| 4,445,126 A | * | 4/1984 | Tsukada | H04N 1/1911 347/245 |
| 9,231,698 B2 | * | 1/2016 | Erkmen | H04B 7/18504 |
| 9,857,472 B2 | * | 1/2018 | Mheen | G01S 7/4817 |
| 2002/0011367 A1 | * | 1/2002 | Kolesnik | G05D 1/0248 180/167 |
| 2004/0119020 A1 | * | 6/2004 | Bodkin | G01J 3/0208 250/353 |
| 2017/0235429 A1 | | 8/2017 | Viswanathan et al. | |
| 2017/0363741 A1 | * | 12/2017 | Send | G01S 7/4816 |
| 2021/0041834 A1 | * | 2/2021 | Christmas | G03H 1/2205 |
| 2021/0382177 A1 | * | 12/2021 | Nagai | G01S 17/931 |
| 2022/0087515 A1 | * | 3/2022 | Kasper | A61B 1/00114 |

FOREIGN PATENT DOCUMENTS

| | | |
|---|---|---|
| DE | 102012207931 A1 | 7/2013 |
| DE | 202014101550 U1 | 7/2015 |

* cited by examiner

*Primary Examiner* — Yuri Kan
(74) *Attorney, Agent, or Firm* — NORTON ROSE FULBRIGHT US LLP; Gerard A. Messina

(57) ABSTRACT

An imaging device, in particular a time-of-flight camera. In imaging device has at least one luminous element, which is designed to emit electromagnetic radiation, and at least one image acquisition element, which is set up to acquire reflected electromagnetic radiation. The imaging device includes at least one beam splitter unit, which is provided to image at least two different fields of view onto the image acquisition element.

12 Claims, 2 Drawing Sheets

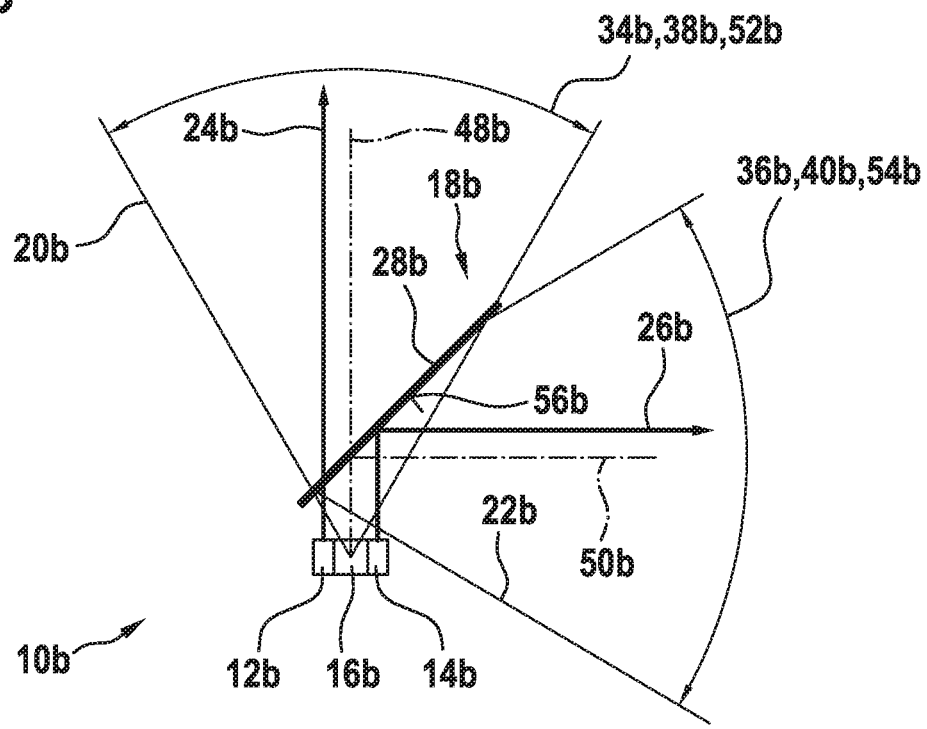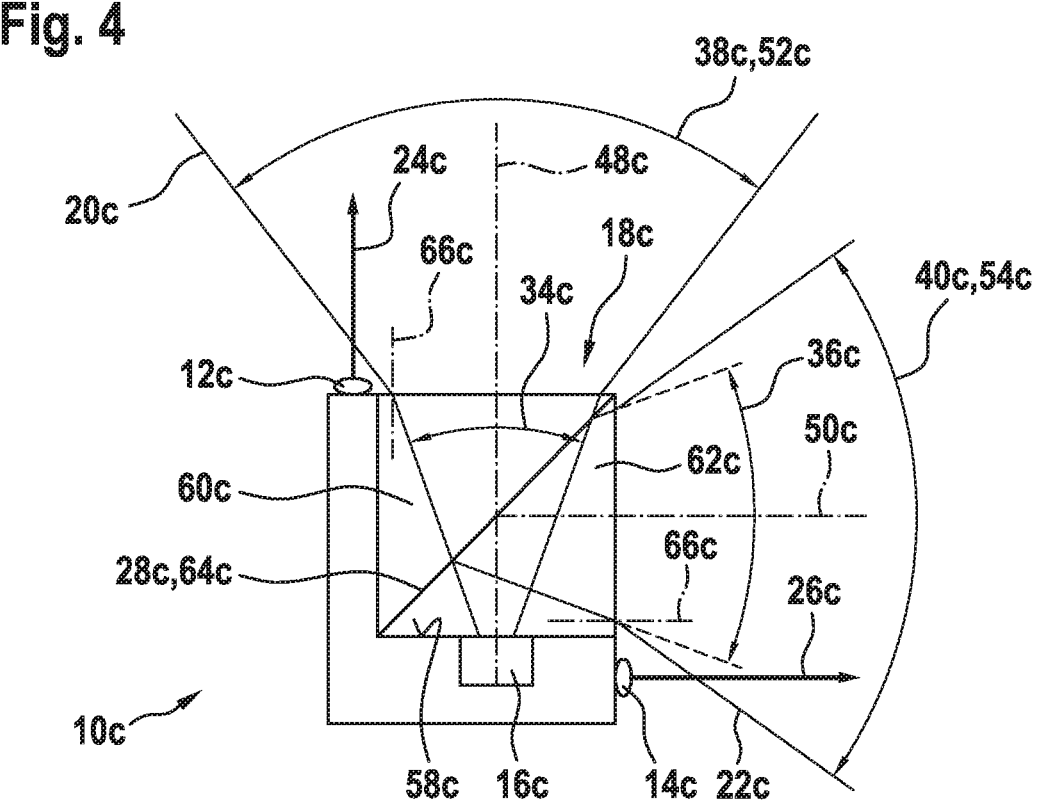

IMAGING DEVICE

CROSS REFERENCE

The present application claims the benefit under 35 U.S.C. § 119 of German Patent Application No. DE 102019214913.8 filed on Sep. 27, 2019, which is expressly incorporated herein by reference in its entirety.

BACKGROUND INFORMATION

A conventional imaging device, in particular a time-of-flight camera, may have at least one luminous element designed to emit electromagnetic radiation, and at least one image acquisition element, which is designed to acquire reflected electromagnetic radiation.

SUMMARY

In accordance with the present invention, an imaging device, in particular a time-of-flight camera, is provided which has at least one luminous element designed to emit electromagnetic radiation, and at least one image acquisition element, which is designed to acquire reflected electromagnetic radiation.

In accordance with an example embodiment of the present invention, the imaging device includes at least one beam splitter unit, which is provided to image at least two different fields of view onto the image acquisition element.

The imaging device is preferably set up to acquire distance information of an environment of the imaging device, in particular to carry out a distance measurement of objects in the environment of the imaging device relative to the imaging device. In particular, the imaging device is set up to perform a three-dimensional distance measurement, in particular to supply a three-dimensional point cloud of information. The imaging device is preferably developed as a time-of-flight camera (ToF camera), which in particular is able to be operated in a direct time-of-flight operating mode and/or in an indirect time-of-flight mode. It is alternatively possible that the imaging device is developed as a laser distance meter, in particular as a LIDAR device (light detection and ranging device), as a RADAR device (radio detection and ranging device), as a stereoscopic camera, or as some other imaging device considered useful by one skilled in the art. The imaging device is preferably provided for use with and/or in a working device, in particular an autonomous working device. The term 'provided' in particular means specially equipped and/or specially set up. The term 'set up' in particular means specially programmed and/or specially configured. When stating that an object is provided or set up for a particular function, this particularly means that the object satisfies and/or executes this particular function in at least one application and/or operating state.

The at least one luminous element is preferably developed as a light-emitting diode (LED), as a laser diode, as a microwave transmitter, or as some other luminous element considered useful by the expert. The at least one luminous element is preferably designed to emit monochromatic electromagnetic radiation, in particular in an infrared spectral range. The at least one luminous element is particularly designed for a two-dimensional emission of electromagnetic radiation, in particular in the form of a radiation cone. In particular, the luminous element is designed to emit electromagnetic radiation featuring an angular distribution, in particular with an opening angle of the radiation cone of at least 45°, preferably at least 60°, especially preferably at least 75°, and most preferably of at least 90°. The at least one luminous element is preferably designed to emit pulses of electromagnetic radiation, in particular in the direct ToF operating mode, and/or, on a continuous basis, electromagnetic radiation of an intensity periodically modulated in time, in particular in the indirect ToF operating mode. The imaging device preferably includes a plurality of luminous elements, in particular two luminous elements.

In accordance with an example embodiment of the present invention, the image acquisition element is particularly set up to acquire electromagnetic radiation reflected by objects to be detected in the environment of the imaging device. In particular, the at least one luminous element is designed to emit electromagnetic radiation that is reflected by the objects to be detected in the environment of the imaging device and acquired by the image acquisition element, especially after a reflection. In particular, the image acquisition element is set up for a wavelength-selective acquisition of electromagnetic radiation, in particular for an acquisition of electromagnetic radiation of at least one wavelength that corresponds at least to a wavelength of the electromagnetic radiation emitted by the at least one luminous element. Preferably, the image acquisition element and/or at least one electronics unit of the imaging device is/are set up to acquire and/or ascertain an elapsed time period between an emission of electromagnetic radiation by the at least one luminous element and an acquisition of the reflected electromagnetic radiation by the image acquisition element, and/or a phase shift between the reflected electromagnetic radiation and an internal reference signal. In particular, the image acquisition element and/or the electronics unit is/are set up to ascertain at least one distance of at least one object in the environment of the imaging device from the imaging device as a function of the elapsed time period between the emission of the electromagnetic radiation by the at least one luminous element and an acquisition of the reflected electromagnetic radiation by the image acquisition element, and/or as a function of the phase shift between the reflected electromagnetic radiation and the internal reference signal. An 'electronics unit' in particular is meant to be understood as a unit that has at least one control electronics. A 'control electronics' in particular denotes a unit having a processor unit and a memory unit as well as an operating program stored in the memory unit.

The image acquisition element is preferably set up for an electronic acquisition of electromagnetic radiation. In particular, the image acquisition element has a plurality of pixels, in particular photodiodes, which are designed to acquire the electromagnetic radiation. The imaging device may preferably include at least one optics unit, in particular having at least one focusing lens, which is provided to steer, in particular focus, electromagnetic radiation onto the image acquisition element.

A 'field of view' in particular describes a region in the environment of the imaging device that is able to be acquired by the image acquisition element and in particular is able to be illuminated by the at least one luminous element. The field of view preferably corresponds at most to a region in the environment of the imaging device illuminated by the at least one luminous element. The beam splitter unit is particularly provided to steer, in particular focus, electromagnetic radiation reflected within at least one field of view onto the image acquisition element. The beam splitter unit is preferably provided to image at least two geometrically differently aligned fields of view onto the image acquisition element. In particular, a center axis of at least a first field of view to be imaged, in particular a center axis of a field of view cone of the at least one first field of view to be imaged, extends transversely, in particular at least essentially at a right angle, to a center axis of at least one second field of view to be imaged, in particular to a center axis of a field of view cone of the at least one second field of view to be imaged. The expression 'essentially at a right angle' is especially meant to define an alignment of a direction relative to a reference direction, the direction and the reference direction, in particular viewed in a projection plane, enclosing an angle of 90°, and the angle having a maximum deviation of in particular less than 8°, advantageously of less than 5°, and especially advantageously of less than 2°. The at least two fields of view in particular have an angular distribution, in particular an opening angle of the field of view cones, of at least 45°, preferably at least 60°, especially preferably at least 75°, and most preferably of at least 90°. In particular, the at least two fields of view may have an identical angular distribution, in particular an identical opening angle of the field of view cones, or they may have a different angular distribution, in particular a different opening angle of the field of view cones. The at least two fields of view may particularly overlap at least regionally.

The at least two fields of view preferably differ at least in different wavelengths of the electromagnetic radiation reflected within the fields of view. Electromagnetic radiation reflected within the at least one first field of view preferably has a different wavelength than electromagnetic radiation reflected within the at least one second field of view. In particular, the beam splitter unit is developed to transmit and reflect in a wavelength-selective manner. The beam splitter unit is preferably provided to image the at least one first field of view onto the image acquisition element by transmitting electromagnetic radiation reflected within the at least one first field of view, and to image the at least one second field of view onto the image acquisition element by reflecting electromagnetic radiation reflected within the at least one second field of view. The beam splitter unit is particularly developed to be transmissive at least to electromagnetic radiation of a wavelength of the electromagnetic radiation reflected within the at least one first field of view and to be reflective at least to electromagnetic radiation of a wavelength of the electromagnetic radiation reflected within the at least one second field of view. The beam splitter unit, in particular at least a transmission and/or reflection surface of the beam splitter unit, preferably extends transversely to the center axes of the at least one first field of view and the at least one second field of view, and/or transversely to a main emission direction of the at least one luminous element. In particular, the beam splitter unit, in particular the at least one transmission and/or reflection surface of the beam splitter unit, extends under an angle that differs from 90°, preferably under an angle of 45°, relative to the center axes of the at least one first field of view and the at least one second field of view, and/or relative to the main emission direction of the at least one luminous element. The main emission direction of the at least one luminous element in particular corresponds to a center axis of a radiation cone emitted by the at least one luminous element. In particular, the imaging device may include a plurality of beam splitter units, in particular aligned transversely with respect to one another, for the imaging of more than two different fields of view onto the image acquisition element.

The imaging device preferably has at least two luminous elements, each one of the luminous elements being designed to illuminate at least one of the at least two fields of view. The at least two luminous elements are preferably designed to emit electromagnetic radiation of different wavelengths. Alternatively or additionally, it is possible that the imaging device includes at least one wavelength-modification unit such as a frequency-doubling crystal by way of example, which is provided to modify a wavelength of electromagnetic radiation emitted by the at least one luminous element for an illumination of at least one of the at least two fields of view. The image acquisition element is particularly set up to acquire reflected electromagnetic radiation with an image frequency of at least five images per second, preferably with an image frequency of at least 10 images per second, particularly preferably with an image frequency of at least 15 images per second, and most preferably with an image frequency of at least 20 images per second. The image acquisition element is particularly set up to acquire reflected electromagnetic radiation with an image frequency of maximally 40 images per second, preferably an image frequency of maximally 35 images per second, particularly preferably an image frequency of maximally 30 images per second, and most preferably an image frequency of maximally 25 images per second. The image acquisition element is preferably set up to acquire, in alternation, at least one image of the wavelength of the electromagnetic radiation reflected within the at least one first field of view, and at least one image of the wavelength of the electromagnetic radiation reflected within the at least one second field of view in each case. In particular, it is possible that the image acquisition element is set up to acquire, in alternation, a plurality of images of the wavelength of the electromagnetic radiation reflected within the at least one first field of view, and a plurality of images of the wavelength of the electromagnetic radiation reflected within the at least one second field of view in each case such as alternately at least five images of the wavelength of the electromagnetic radiation reflected within the at least one first field of view and at least five images of the wavelength of the electromagnetic radiation reflected within the at least one second field of view in each case, or alternately at least ten images of the wavelength of the electromagnetic radiation reflected within the at least one first field of view and at least ten images of the wavelength of the electromagnetic radiation reflected within the at least one second field of view in each case.

In an advantageous manner, the development of the imaging device according to the present invention allows for a broad field of view coverage. At the same time, a high resolution and a large range of the imaging device is/are advantageously able to be achieved. A broad field of view coverage is advantageously possible using a single image acquisition element. Additional image acquisition elements and/or a complex optical system for achieving a broad field of view coverage is/are advantageously unnecessary. In an advantageous manner, an imaging device, which has few components, in particular low wear and is able to be produced in an economical manner, is able to be made available.

In addition, it is provided that the imaging device includes at least two, in particular the aforementioned luminous elements, which define the at least two different fields of view to be imaged by the beam splitter unit through the emission of electromagnetic radiation that differs at least in its wavelength. In particular, at least one first luminous element is designed to emit electromagnetic radiation of a first wavelength, in particular into the at least one first field of view, in order to define the at least one first field of view. At least one second luminous element is particularly designed to emit electromagnetic radiation of a second wavelength designed to differ from the first wavelength of the electromagnetic radiation emitted by the at least one first luminous element, in particular at least into a second field of view, in order to define the at least one second field of view. The at least two luminous elements, in particular the main radiation directions of the luminous elements, and the beam splitter unit are preferably aligned relative to each other in such a way that electromagnetic radiation emitted by the at least two luminous elements, in particular prior to a reflection at objects in the environment of the imaging device, impinges upon the beam splitter unit, in particular is transmitted or reflected by the beam splitter unit. The at least two luminous elements are in particular situated on sides of the image acquisition element that face away from one another. The beam splitter unit is preferably set up to transmit electromagnetic radiation of one of the two luminous elements and to reflect electromagnetic radiation of a further one of the at least two luminous elements. The main emission direction of the at least one first luminous element, in particular prior to an impingement of the electromagnetic radiation upon the beam splitter unit, is at least essentially aligned in parallel with the main emission direction of the at least one second luminous element. The expression 'at least essentially in parallel with' is particularly to be understood as an alignment of a direction relative to a reference direction, in particular in a plane, the direction having a deviation of in particular less than 8°, advantageously of less than 5°, and especially advantageously of less than 2° relative to the reference direction.

As an alternative, it is possible that the main emission direction of the at least one first luminous element is aligned transversely, in particular at least essentially at a right angle, to the main emission direction of the at least one second luminous element. In the alternative embodiment, at least one of the at least two luminous elements is preferably situated, in particular separately from the image acquisition element, relative to the beam splitter unit in such a way that electromagnetic radiation emitted by the at least one of the at least two luminous elements, in particular prior to a reflection at objects in the environment of the imaging device, is free of an impingement upon the beam splitter unit, in particular free of a transmission and a reflection by the beam splitter unit. In an advantageous manner, different fields of view are able to be defined using electromagnetic radiation of different wavelengths.

It is furthermore provided that the beam splitter unit is provided to align in particular the previously mentioned main emission directions of the two luminous elements in an angled manner, in particular at least essentially at a right angle, relative to one another. The beam splitter unit is preferably provided to deflect, in particular to reflect, electromagnetic radiation emitted by the second luminous element in such a way that the main emission direction of the second luminous element, in particular downstream from the beam splitter unit, is aligned at an angle, in particular at least essentially at a right angle, to the main emission direction of the first luminous element. In particular, the beam splitter unit is provided to modify the main emission direction of the second luminous element, in particular to rotate it, preferably by 90°. The beam splitter unit is preferably provided to keep the main emission direction of the first luminous element unchanged. In particular, an alignment of the main emission directions of the two luminous elements relative to each other, especially after an impingement of the electromagnetic radiation upon the beam splitter unit, is dependent on an alignment of the beam splitter unit, in particular the transmission and/or reflection surface of the beam splitter unit, relative to the main emission directions of the two luminous elements, in particular prior to an impingement of the electromagnetic radiation upon the beam splitter unit. The main emission directions of the luminous elements, especially prior to an impingement of the electromagnetic radiation upon the beam splitter unit, is preferably aligned at least essentially in parallel with one another, and the beam splitter unit, in particular the transmission and/or reflection surface of the beam splitter unit, is aligned under an angle, in particular under an angle of 45°, relative to the main emission directions of the luminous elements. Two geometrically differently aligned fields of view are able to be generated in an advantageous manner.

The beam splitter unit is furthermore provided to transmit at least electromagnetic radiation of a first wavelength, in particular of at least one luminous element, in particular the previously mentioned first luminous element, and to reflect at least electromagnetic radiation of a second wavelength, in particular of a second luminous element, in particular the previously mentioned second luminous element. The beam splitter unit is preferably provided to transmit electromagnetic radiation from at least a certain first spectral range that includes at least the first wavelength, and to reflect electromagnetic radiation from at least a certain second spectral range that includes at least the second wavelength. The first spectral range and the second spectral range preferably have a different development from each other, and in particular include different wavelengths. The first wavelength and the second wavelength particularly differ in their developments. A spectral selection of electromagnetic radiation is made possible for the realization of a spectrally dependent imaging of fields of view.

It is additionally provided that the luminous elements are designed to emit different monochromatic electromagnetic radiation. In particular, the luminous elements are designed to emit electromagnetic radiation of a single wavelength. The image acquisition element is preferably set up to acquire electromagnetic radiation of the luminous elements having the two different wavelengths. In particular, the image acquisition element is developed without the capability of acquiring electromagnetic radiation having a wavelength that differs from the two wavelengths of the electromagnetic radiation of the luminous elements, and/or is developed to ignore electromagnetic radiation having a wavelength that differs from the two wavelengths of the electromagnetic radiation of the luminous elements. Preferably, the image acquisition element and/or the electronics unit of the imaging device is/are set up to allocate acquired and/or ascertained information, in particular distance information, to the first field of view or to the second field of view as a function of the wavelength of the acquired electromagnetic radiation. The image acquisition element and/or the electronics unit of the imaging device is/are preferably set up to ascertain from the acquired and/or ascertained information of the individual fields of view an overall image, in particular an overall three-dimensional point cloud of information, for all imaged fields of view. In an advantageous manner, an influence of interference radiation is able to be kept to a minimum. In an advantageous manner, a field of view allocation of information is possible.

It is furthermore provided that the beam splitter unit includes at least one beam splitter element on which at least one bandpass filter element is situated on a side facing away from the image acquisition element for the imaging of at least one, in particular the previously mentioned, first field of view onto the image acquisition element, the bandpass filter element being provided to transmit electromagnetic radiation at most in a spectral range around the first wavelength. The beam splitter element is preferably provided to transmit electromagnetic radiation, in particular at least in the spectral range around the first wavelength. In particular, the bandpass filter element is at least partially able to form the beam splitter element. Alternatively, it is possible that the bandpass filter element is developed as a component fixed in place on the beam splitter element, as a coating of the beam splitter element, or the like. The bandpass filter element is preferably provided to transmit electromagnetic radiation of the first wavelength. In particular, the bandpass filter element is provided to transmit electromagnetic radiation from a spectral range that includes the first wavelength, in particular electromagnetic radiation emitted by the first luminous element. The bandpass filter element is particularly provided to absorb and/or to reflect electromagnetic radiation from a further spectral range which is developed free of the first wavelength. The bandpass filter element is preferably provided to absorb and/or to reflect electromagnetic radiation of the second wavelength, in particular electromagnetic radiation emitted by the second luminous element. A transmission of electromagnetic radiation of the first wavelength in order to realize beam splitting is advantageously possible. The first field of view is advantageously able to be imaged onto the image acquisition element.

In addition, in order to image at least one, in particular the aforementioned, second field of view onto the image acquisition element, at least one reflector element is situated on the beam splitter element on a side facing the image acquisition element, the reflector element being provided to reflect electromagnetic radiation at most in a spectral range around the second wavelength. In particular, the reflector element is at least partially able to form the beam splitter element, especially together with the bandpass filter element. As an alternative, it is possible that the reflector element is developed as a component fixed in place on the beam splitter element, as a coating of the beam splitter element, or something like it. Preferably, the reflector element is provided to reflect electromagnetic radiation of the second wavelength. In particular, the reflector element is provided to reflect electromagnetic radiation from a spectral range that includes the second wavelength, in particular electromagnetic radiation emitted by the second luminous element. The reflector element is particularly provided to transmit electromagnetic radiation from at least one further spectral range, which is developed free of the second wavelength. A reflection of electromagnetic radiation of the second wavelength in order to realize beam splitting is advantageously possible. In an advantageous manner, the second field of view is able to be imaged onto the image acquisition element.

In addition, the reflector element is provided to transmit electromagnetic radiation outside the spectral range around the second wavelength. The reflector element is particularly provided to transmit electromagnetic radiation from all spectral ranges outside the spectral range around the second wavelength. The reflector element is preferably provided to transmit electromagnetic radiation of the first wavelength, in particular electromagnetic radiation emitted by the first luminous element. An influence of interference radiation in the second field of view is advantageously able to be kept to a minimum. An interference-free transmission of electromagnetic radiation of the first wavelength is possible, in particular electromagnetic radiation emitted by the first luminous element.

It is additionally provided that the beam splitter unit includes at least one beam splitter element developed as a dichroic mirror, which in order to image the at least two different fields of view onto the image acquisition element, is provided to transmit electromagnetic radiation of a smaller wavelength than a limit wavelength lying between the first and the second wavelength, and to reflect electromagnetic radiation of a greater wavelength than the limit wavelength. As an alternative or in addition to the bandpass filter element and/or the reflector element, the beam splitter unit particularly has the at least one beam splitter element developed as a dichroic mirror. The beam splitter element preferably serves as an edge filter. As an alternative, it is possible that the beam splitter unit has a dichroic mirror, which is developed as a separate component and fastened to the beam splitter element, or which is developed as a coating of the beam splitter element or the like. In particular, the beam splitter element developed as a dichroic mirror is provided to transmit electromagnetic radiation of the first wavelength, in particular electromagnetic radiation emitted by the first luminous element. The beam splitter element developed as a dichroic mirror is particularly provided to reflect electromagnetic radiation of the second wavelength, in particular electromagnetic radiation emitted by the second luminous element. A further possibility for imaging the two fields of view onto the image acquisition element is advantageously able to be provided.

In addition, it is provided that the beam splitter unit is developed as a beam splitter cube provided for imaging the at least two different fields of view onto the image acquisition element using viewing angles that are smaller than the field of view angles of the fields of view. Alternatively or additionally, the beam splitter unit is particularly developed as a beam splitter cube in order to encompass the bandpass filter element, the reflector element and/or the beam splitter element developed as a dichroic mirror. The beam splitter cube preferably has a cube-type development, at least one beam splitter element of the beam splitter unit forming a diagonal surface of the beam splitter cube. The image acquisition element is particularly situated on an inner side surface of the beam splitter cube. The beam splitter cube is preferably developed from a material that is transparent at least to electromagnetic radiation of the first wavelength and the second wavelength such as glass, plastic or a similar material. In particular, the beam splitter cube may be formed from two prisms that are glued together, in which case a connecting surface of the prisms forms the beam splitter element of the beam splitter unit.

A material of the beam splitter cube preferably has a higher optical refractive index than the environment of the imaging device, in particular air. The beam splitter cube is preferably provided to refract the reflected radiation arriving from outside the beam splitter cube when it enters the beam splitter cube, in particular in the direction of an optical axis. A "viewing angle" of the field of view in particular means an angular distribution of the field of view, in particular an angle of the field of view cone, on the image acquisition element. A 'field of view angle' of a field of view should in particular be understood as an angular distribution of the field of view, in particular an angle of the field of view cone, outside the beam splitter cube, in particular of an actually monitored field of view. The beam splitter cube is preferably provided to image the two fields of view onto the image acquisition element as a function of a refraction of the reflected electromagnetic radiation using image angles that are smaller than field of view angles of the fields of view. The beam splitter cube is particularly provided to image the two fields of view onto the image acquisition element using image angles relative to the field of view angles of the fields of view that become smaller the greater the optical refractive index of the beam splitter cube. In an advantageous manner, a particularly broad field of view is able to be covered. An imaging device featuring an especially compact development is advantageously able to be provided.

In addition, the present invention starts out from an autonomous device, in particular an autonomous working device, which includes at least one imaging device according to the present invention. The autonomous device is particularly provided for an at least partially autonomous locomotion, in particular across a surface, in the air, in water or the like. The autonomous device may particularly be developed as a vacuum cleaner robot, as a lawn mower robot, as an autonomous drone, an autonomous industrial truck, in particular as an autonomous factory floor transport vehicle, a self-driving automobile, as a cleaning robot, a pool cleaner robot or as some other autonomous device considered useful by an expert. The autonomous device, in particular developed as an autonomous working device, is preferably provided to carry out at least one work task in an at least partially autonomous manner, e.g., to vacuum the floor, to mow, to clean, or the like, to transport objects and/or persons, to monitor an area, or some other task considered useful by the expert. The autonomous device preferably includes at least one electronics unit, which is set up to actuate at least one drive unit of the autonomous device, at least one navigation unit of the autonomous device, at least one processing unit of the autonomous device or the like as a function of at least one signal from the imaging device, in particular as a function of an evaluation of the at least one signal from the imaging device. In particular, the electronics unit of the autonomous device is set up to ascertain at least one position of the autonomous device, to identify at least one obstacle and especially to circumvent it, to map an environment of the autonomous vehicle or the like as a function of the at least one signal of the imaging device. Preferably, the electronics unit of the autonomous device is set up for SLAM (simultaneous localization and mapping) as a function of the at least one signal from the imaging device. In an advantageous manner, monitoring is able to be carried out in a broad field of view around the autonomous device. An autonomous device, which is able to be used in a safe and comfortable manner, is advantageously able to be provided.

The imaging device according to the present invention and/or the autonomous device according to the present invention is/are not meant to be limited to the afore-described application and embodiment. In order to satisfy a method of functioning described herein, the imaging device according to the present invention and/or the autonomous device according to the present invention may particularly have a number of individual elements, components and units that differs from the number described herein. As far as the value ranges mentioned in this disclosure are concerned, values that lie within the mentioned limits are also considered to be disclosed and able to be used as desired.

BRIEF DESCRIPTION OF THE DRAWINGS

Additional advantages result from the following figure description. Three exemplary embodiments of the present invention are illustrated in the figures. The figures and the description include numerous features in combination. For practical purposes, one skilled in the art will also look at the features in isolation and combine them into meaningful further combinations.

FIG. 3 shows an alternative imaging device according to an example embodiment of the present invention in a schematic representation.

FIG. 4 shows a further alternative imaging device according to an example embodiment of the present invention in a schematic illustration.

DETAILED DESCRIPTION OF EXAMPLE EMBODIMENTS

Figure 1:
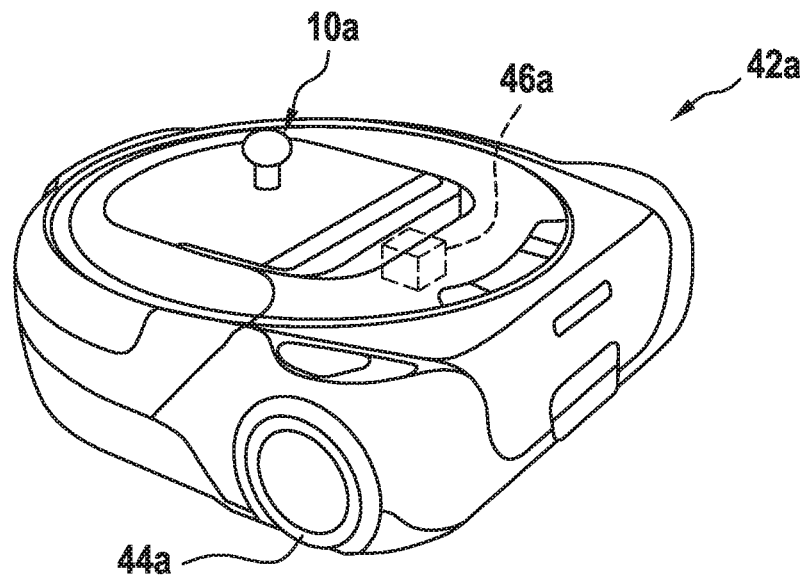
FIG. 1 shows an autonomous device according to an example embodiment of the present invention in a perspective schematic representation.

FIG. 1 shows an autonomous device 42a, in particular an autonomous working device, in a perspective schematic illustration. Autonomous device 42a in particular includes at least one imaging device 10a, in particular a time-of-flight camera. Autonomous device 42a in particular is provided for an at least partially autonomous locomotion, in particular across a surface, e.g., in the air, in water or the like in this exemplary embodiment by way of example. In particular, autonomous device 42a has wheels 44a for a locomotion across a surface. Autonomous device 42a may particularly be developed as a vacuum cleaner robot as in this exemplary embodiment by way of example, as a lawnmower robot, as an autonomous drone, an autonomous industrial truck, in particular an autonomous factory floor transport vehicle, as a self-driving passenger car, a cleaning robot, a pool cleaning robot or as some other autonomous device considered useful by one skilled in the art. Autonomous device 42a, in particular developed as an autonomous working device, is preferably provided to perform a task, e.g., to vacuum a floor, such as in the present exemplary embodiment by way of example, to mow, clean or the like, to transport objects and/or persons, to monitor an area or to perform some other task considered useful by one skilled in the art, in an at least partially autonomous manner. Autonomous device 42a preferably includes at least one electronics unit 46a, which is set up to actuate at least one drive unit of autonomous device 42a, at least one navigation unit of autonomous device 42a, at least one processing unit of autonomous device 42a or the like (not shown further here) as a function of at least one signal from imaging device 10a, in particular as a function of an evaluation of the at least one signal from imaging device 10a. Electronics unit 46a of autonomous device 42a is particularly set up to ascertain at least one position of autonomous device 42a, to identify at least one obstacle and in particular to circumvent it, to perform mapping of an environment of autonomous device 42a or the like as a function of the at least one signal from imaging device 10a. Electronics unit 46a of autonomous device 42a is preferably set up for SLAM as a function of the at least one signal from imaging device 10a.

Figure 2:
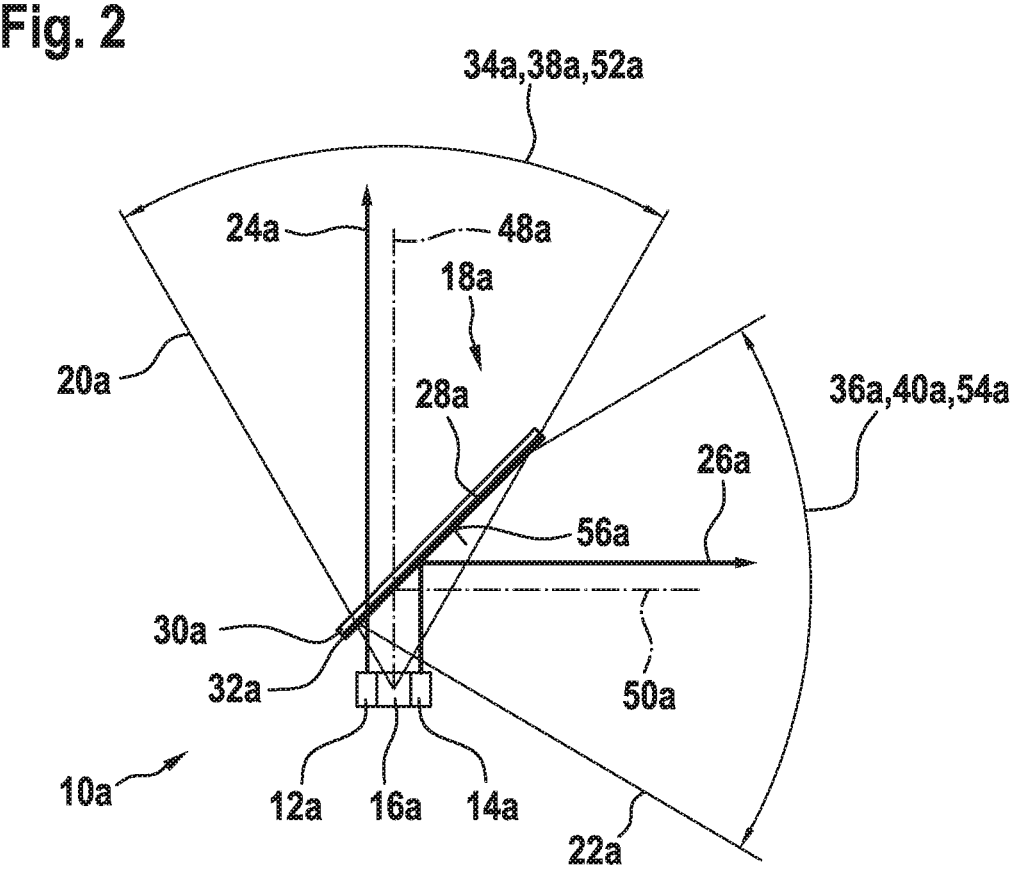
FIG. 2 shows an imaging device according to an example embodiment of the present invention of the autonomous device of the example embodiment of the present invention from FIG. 1 in a schematic representation.

FIG. 2 shows imaging device 10a of autonomous device 42a from FIG. 1 in a schematic representation. Imaging device 10a preferably includes at least one luminous element 12a, 14a, which is designed to emit electromagnetic radiation, and at least one image acquisition element 16a, which is set up to acquire reflected electromagnetic radiation. Imaging device 10a preferably includes at least one beam splitter unit 18a provided to image at least two different fields of view 20a, 22a onto image acquisition element 16a. Imaging device 10a is preferably set up to acquire distance information of an environment of imaging device 10a, in particular to carry out a distance measurement of objects in the environment of imaging device 10a relative to imaging device 10a. Imaging device 10a is particularly set up to perform a three-dimensional distance measurement, in particular to provide a three-dimensional point cloud of information. Imaging device 10a is preferably developed as a ToF camera, which is able to be operated in a direct time-of-flight operating mode and/or in an indirect time-of-flight mode, in particular. Alternatively, it is possible that imaging device 10a is developed as a laser distance meter, in particular as a LIDAR device, as a RADAR device, as a stereoscopic camera or as some other imaging device considered useful by one skilled in the art. Imaging device 10a is preferably provided for use with and/or in a working device, in particular device 42a developed as an autonomous working device.

Imaging device 10a preferably includes a plurality of luminous elements 12a, 14a, in particular two luminous elements 12a, 14a such as in the present exemplary embodiment by way of example. Luminous elements 12a, 14a are preferably developed as light-emitting diodes, exemplarily as laser diodes such as in this particular embodiment, as microwave transmitters or as other luminous elements considered useful by one skilled in the art. Luminous elements 12a, 14a are preferably designed to emit monochromatic electromagnetic radiation, in particular in an infrared spectral range. Luminous elements 12a, 14a are particularly developed for a two-dimensional emission of electromagnetic radiation, in particular in the form of a radiation cone. In particular, luminous elements 12a, 14a are designed to emit electromagnetic radiation featuring an angular distribution, in particular with an opening angle of the radiation cone of at least 45°, preferably at least 60°, especially preferably at least 75°, and most preferably at least 90°. For the sake of clarity, only main emission directions 24a, 26a of luminous elements 12a, 14a are shown in FIG. 2. Luminous elements 12a, 14a are preferably designed to emit pulses of electromagnetic radiation, especially in the direct ToF operating mode, and/or to emit electromagnetic radiation having an intensity periodically modulated over time on a continuous basis, especially in the indirect ToF operating mode.

Image acquisition element 16a is particularly set up to acquire electromagnetic radiation reflected by objects to be detected in the environment of imaging device 10a. In particular, luminous elements 12a, 14a are developed to emit electromagnetic radiation, which is reflected by the objects to be detected in the environment of imaging device 10a and is acquired, in particular after a reflection by image acquisition element 16a. Image acquisition element 16a is particularly set up for a wavelength-selective acquisition of electromagnetic radiation, in particular for an acquisition of electromagnetic radiation of at least one wavelength corresponding at least to a wavelength of the electromagnetic radiation emitted by luminous elements 12a, 14a. Preferably, image acquisition element 16a and/or at least one electronics unit of imaging device 10a (not shown here further) is/are set up to acquire and/or ascertain an elapsed time period between an emission of electromagnetic radiation by luminous elements 12a, 14a and an acquisition of the reflected electromagnetic radiation by image acquisition element 16a, and/or a phase shift between the reflected electromagnetic radiation and an internal reference signal. In particular, image acquisition element 16a and/or the electronics unit is/are designed to ascertain at least a distance of at least one object in the environment of imaging device 10a from imaging device 10a as a function of the elapsed time period between the emission of the electromagnetic radiation by luminous elements 12a, 14a and an acquisition of the reflected electromagnetic radiation by image acquisition element 16a, and/or as a function of the phase shift between the reflected electromagnetic radiation and the internal reference signal.

Image acquisition element 16a is preferably set up for an electronic acquisition of electromagnetic radiation. In particular, image acquisition element 16a has a multitude of pixels, in particular photodiodes, which are developed to acquire the electromagnetic radiation (not shown here). Imaging device 10a may preferably include at least one optics unit, in particular having at least one focusing lens, which is provided to steer, in particular focus, electromagnetic radiation onto image acquisition element 16a (not shown here).

A first field of view 20a preferably corresponds at most to a region in the environment of imaging device 10a illuminated by a first luminous element 12a. A second field of view 22a preferably corresponds at most to a region in the environment of imaging device 10a illuminated by a second luminous element 14a. In particular, fields of view 20a, 22a, especially field of view cones of fields of view 20a, 22a, are shown in two-dimensional form in FIG. 2 for the sake of clarity. Beam splitter unit 18a is particularly provided to steer, in particular focus, electromagnetic radiation reflected within fields of view 20a, 22a onto image acquisition element 16a. Beam splitter unit 18a is preferably provided to image the at least two at least geometrically differently aligned fields of view 20a, 22a onto image acquisition element 16a. A center axis 48a of the at least one first field of view 20a to be imaged, in particular a center axis 48a of a field of view cone of the at least one first field of view 20a to be imaged, extends transversely, in particular at least essentially at a right angle, to a center axis 50a of the at least one second field of view 22a to be imaged, in particular to a center axis 50a of a field of view cone of the at least one second field of view 22a to be imaged. The at least two fields of view 20a, 22a in particular have an angular distribution, in particular an opening angle 52a, 54a of the field of view cones, of at least 45°, preferably of at least 60°, such as in the present exemplary embodiment by way of example, especially preferably of at least 75°, and most preferably of at least 90°. In particular, the at least two fields of view 20a, 22a may have an identical angular distribution, in particular an identical opening angle 52a, 54a of the field of view cones, such as in the present exemplary embodiment by way of example, or they may have a different angular distribution, in particular a different opening angle 52a, 54a of the field of view cones. The at least two fields of view 20a, 22a may in particular overlap at least regionally.

The at least two fields of view 20a, 22a preferably differ at least in different wavelengths of the electromagnetic radiation reflected within fields of view 20a, 22a. Preferably, the electromagnetic radiation reflected within the at least one first field of view 20a has a different wavelength than the electromagnetic radiation reflected within the at least one second field of view 22a. In particular, beam splitter unit 18a is designed to be transmissive and reflective in a wavelength-selective manner. Preferably, beam splitter unit 18a is provided to image the at least one first field of view 20a onto image acquisition element 16a through the transmission of electromagnetic radiation reflected within the at least one first field of view 20a, and to image the at least one second field of view 22a onto image acquisition element 16a through a reflection of electromagnetic radiation reflected within the at least one second field of view 22a. In particular, beam splitter unit 18a is designed to be transmissive at least to electromagnetic radiation of a wavelength of the electromagnetic radiation reflected within the at least one first field of view 20a, and developed to be reflective at least to electromagnetic radiation of a wavelength of the electromagnetic radiation reflected within the at least one second field of view 22a. Beam splitter unit 18a, in particular at least one transmission and/or reflection surface 56a of beam splitter unit 18a, extends transversely to center axes 48a, 50a of the at least one first field of view 20a and the at least one second field of view 22a, and/or transversely to main emission directions 24a, 26a of luminous elements 12a, 14a. Beam splitter unit 18a, in particular the at least one transmission and/or reflection surface 56a of beam splitter unit 18a, in particular extends under an angle that differs from 90°, preferably under an angle of 45°, relative to the center axes 48a, 50a of the at least one first field of view 20a and the at least one second field of view 22a, and/or relative to main emission directions 24a, 26a of luminous elements 12a, 14a. Main emission directions 24a, 26a of luminous elements 12a, 14a in particular correspond to center axes of radiation cones emitted by luminous elements 12a, 14a. In an alternative embodiment, imaging device 10a may particularly include a plurality of beam splitter units 18a, which are aligned especially transversely relative to one another for the imaging of more than two different fields of view 20a, 22a onto image acquisition element 16a.

Preferably, imaging device 10a has the at least two luminous elements 12a, 14a, one of luminous elements 12a, 14a in each case being designed to illuminate at least one of the at least two fields of view 20a, 22a. In this particular exemplary embodiment, first luminous element 12a is designed to illuminate first field of view 20a, and second luminous element 14a is designed to illuminate second field of view 22a by way of example. The at least two luminous elements 12a, 14a are preferably designed to emit electromagnetic radiation of different wavelengths. Alternatively or additionally, it is possible that imaging device 10a has at least one wavelength modification unit such as a frequency-doubling crystal, which is designed to modify a wavelength of electromagnetic radiation emitted by at least one of luminous elements 12a, 14a for an illumination of at least one of the at least two fields of view 20a, 22a. Image acquisition unit 16a is particularly set up to acquire reflected electromagnetic radiation with an image frequency of at least five images per second, preferably with an image frequency of at least ten images per second, especially preferably with an image frequency of at least 15 images per second, and most preferably, with an image frequency of at least 20 images per second. Image acquisition unit 16a is particularly set up to acquire reflected electromagnetic radiation with an image frequency of at most 40 images per second, preferably with an image frequency of at most 35 images per second, especially preferably with an image frequency of at most 30 images per second, and most preferably with an image frequency of at most 25 images per second. Image acquisition element 16a is preferably set up to acquire, in alternation, at least one image of the wavelength of the electromagnetic radiation reflected within the at least one first field of view 20a, and at least one image of the wavelength of the electromagnetic radiation reflected within the at least one second field of view 22a in each case. In particular, it is possible that image acquisition element 16a is set up to acquire, in alternation, a multiplicity of images of the wavelength of the electromagnetic radiation reflected within the at least one first field of view 20a and a multiplicity of images of the wavelength of the electromagnetic radiation reflected within the at least one second field of view 22a in each case, e.g., in alternation, at least five images of the wavelength of the electromagnetic radiation reflected within the at least one first field of view 20a and at least five images of the wavelength of the electromagnetic radiation reflected within the at least one second field of view 22a in each case, or in alternation, at least ten images of the wavelength of the electromagnetic radiation reflected within the at least one first field of view 20a and at least ten images of the wavelength of the electromagnetic radiation reflected within the at least one second field of view 22a in each case.

Imaging device 10a preferably includes at least two, in particular the aforementioned, luminous elements 12a, 14a, which define the at least two different fields of view 20a, 22a to be imaged by beam splitter unit 18a by an emission of electromagnetic radiation that differs in at least its wavelength. In particular, first luminous element 12a is designed to emit electromagnetic radiation of a first wavelength, in particular at least into the at least one first field of view 20a, for a definition of the at least one first field of view 20a. Second luminous element 14a is particularly designed to emit electromagnetic radiation of a second wavelength that differs from the first wavelength of the electromagnetic radiation emitted by the at least one first luminous element 12a, in particular at least into the at least one second field of view 22a, for the definition of the at least one second field of view 22a. The at least two luminous elements 12a, 14a, in particular main emission directions 24a, 26a of luminous elements 12a, 14a, and beam splitter unit 18a are aligned in such a way relative to one another that electromagnetic radiation emitted by the at least two luminous elements 12a, 14a impinges upon beam splitter unit 18a, in particular prior to a reflection at objects in the environment of imaging device 10a, and especially is transmitted or reflected by beam splitter unit 18a. The at least two luminous elements 12a, 14a are disposed on sides of image acquisition element 16a that face away from each other. Beam splitter unit 18a is preferably set up to transmit electromagnetic radiation of one of the at least two luminous elements 12a, 14a, i.e. electromagnetic radiation of first luminous element 12a in this exemplary embodiment by way of example, and to reflect electromagnetic radiation of a further one of the at least two luminous elements 12a, 14a, in this exemplary embodiment electromagnetic radiation of second luminous element 14a by way of example. Main emission direction 24a of the at least one first luminous element 12a is preferably aligned at least essentially in parallel with main emission direction 26a of the at least one second luminous element 14a, in particular prior to an impingement of the electromagnetic radiation upon beam splitter unit 18a.

As an alternative, it is possible that main emission direction 24a of the at least one first luminous element 12a is aligned transversely, in particular at least essentially at a right angle, to main emission direction 26a of the at least one second luminous element 14a. In the alternative embodiment, at least one of the at least two luminous elements 12a, 14a is preferably situated, in particular separately from image acquisition element 16a, in such a way relative to beam splitter unit 18a that electromagnetic radiation emitted by the at least one of the at least two luminous elements 12a, 14a is free of an impingement upon beam splitter unit 18a, in particular prior to a reflection at objects in the environment of imaging device 10a, and in particular is free of a transmission and a reflection by beam splitter unit 18a.

Beam splitter unit 18a is preferably provided to align main emission directions 24a, 26a of the two luminous elements 12a, 14a at an angle, in particular at least essentially at a right angle, relative to each other. Beam splitter unit 18a is preferably provided to deflect, in particular reflect, electromagnetic radiation emitted by second luminous element 14a in such a way that main emission direction 26a of second luminous element 14a is particularly aligned at an angle, in particular at least essentially at a right angle, with respect to main emission direction 24a of first luminous element 12a, in particular downstream from beam splitter unit 18a. In particular, beam splitter unit 18a is provided to modify main emission direction 26a of second luminous element 14a, in particular to rotate it, preferably by 90°. Beam splitter unit 18a is preferably provided to keep main emission direction 24a of first luminous element unchanged. In particular, an alignment of main emission directions 24a, 26a of the two luminous elements 12a, 14a relative to each other, especially after an impingement of the electromagnetic radiation upon beam splitter unit 18a, is dependent on an alignment of beam splitter unit 18a, in particular of transmission and/or reflection surface 56a of beam splitter unit 18a, relative to main emission directions 24a, 26a of the two luminous elements 12a, 14a, in particular prior to an impingement of the electromagnetic radiation upon beam splitter unit 18a. Main emission directions 24a, 26a of luminous elements 12a, 14a, in particular prior to an impingement of the electromagnetic radiation upon beam splitter unit 18a, are aligned essentially in parallel with one another, and beam splitter unit 18a, in particular transmission and/or reflection surface 56a of beam splitter unit 18a, is particularly aligned at an angle, in particular under an angle of 45°, relative to main emission directions 24a, 26a of luminous elements 12a, 14a.

Preferably, beam splitter unit 18a is provided to transmit at least electromagnetic radiation of a first wavelength, in particular of a, in particular the previously mentioned, first luminous element 12a, and to reflect at least electromagnetic radiation of a second wavelength, in particular of a, in particular the previously mentioned, second luminous element 14a. Beam splitter unit 18a is preferably provided to transmit electromagnetic radiation from at least a certain first spectral range, which includes at least the first wavelength, and to reflect electromagnetic radiation from at least a certain second spectral range, which includes at least the second wavelength. The first spectral range and the second spectral range are preferably developed to differ from each other and particularly include different wavelengths. In particular, the first wavelength and the second wavelength differ in their development.

Luminous elements 12a, 14a are preferably designed to emit different monochromatic electromagnetic radiation. In particular, luminous elements 12a, 14a are designed to emit electromagnetic radiation of a single wavelength. Image acquisition element 16a is preferably set up to acquire electromagnetic radiation of luminous elements 12a, 14a having the two different wavelengths. In particular, image acquisition element 16a is developed without the capability of acquiring electromagnetic radiation of a wavelength that differs from the two wavelengths of the electromagnetic radiation of luminous elements 12a, 14a, and/or is set up to ignore electromagnetic radiation having a wavelength that differs from the two wavelengths of the electromagnetic radiation of luminous elements 12a, 14a. Image acquisition element 16a and/or the electronics unit of imaging device 10a is/are preferably set up to allocate acquired and/or ascertained information, especially distance information, to first field of view 20a or to second field of view 22a as a function of the wavelength of the acquired electromagnetic radiation. Preferably, image acquisition element 16a and/or the electronics unit of imaging device 10a is/are set up to ascertain from the acquired and/or ascertained information of the individual fields of view 20a, 22a an overall image, in particular an overall three-dimensional point cloud of information, for all imaged fields of view 20a, 22a.

Beam splitter unit 18a preferably includes at least one beam splitter element 28a on which, for the purpose of imaging at least one, in particular the previously mentioned, first field of view 20a onto image acquisition element 16a, at least one bandpass filter element 30a is situated on a side facing away from image acquisition element 16a, bandpass filter element 30a being provided to transmit electromagnetic radiation at most in a spectral range around the first wavelength. Preferably, beam splitter element 28a is provided to transmit electromagnetic radiation, in particular at least in the spectral range around the first wavelength. In particular, bandpass filter element 30a is able to at least partially form beam splitter element 28a, as in the present exemplary embodiment by way of example. As an alternative, it is possible that bandpass filter element 30a is developed as a component which is fixed in place on beam splitter element 28a, as a coating of beam splitter element 28a or the like. Bandpass filter element 30a is preferably provided to transmit electromagnetic radiation of the first wavelength. In particular, bandpass filter element 30a is provided to transmit electromagnetic radiation from a spectral range which encompasses the first wavelength, in particular electromagnetic radiation emitted by first luminous element 12a. Bandpass filter element 30a is particularly provided to absorb and/or reflect electromagnetic radiation from a further spectral range, which is developed free of the first wavelength. Preferably, bandpass filter element 30a is provided to absorb and/or reflect electromagnetic radiation of the second wavelength, in particular electromagnetic radiation emitted by second luminous element 14a.

For the imaging of at least one, in particular the previously mentioned, second field of view 22a onto image acquisition element 16a, at least one reflector element 32a is disposed on beam splitter element 28a on a side facing image acquisition element 16a, which is provided to reflect electromagnetic radiation at most in a spectral range around the second wavelength. In particular, reflector element 32a may at least partially form beam splitter element 28a, in particular together with bandpass filter element 30a, as in the present exemplary embodiment by way of example. Alternatively, it is possible that reflector element 32a is developed as a component fixed in place on beam splitter element 28a, as a coating of beam splitter element 28a, or the like. Reflector element 32a is preferably provided to reflect electromagnetic radiation of the second wavelength. Reflector element 32a is particularly provided to reflect electromagnetic radiation from a spectral range that encompasses the second wavelength, in particular electromagnetic radiation emitted by second luminous element 14a. In particular, reflector element 32a is provided to transmit electromagnetic radiation from at least one further spectral range, which is developed free of the second wavelength.

Reflector element 32a is preferably provided to transmit electromagnetic radiation outside the spectral range around the second wavelength. In particular, reflector element 32a is provided to transmit electromagnetic radiation from all spectral ranges outside the spectral range around the second wavelength. Reflector element 32a is preferably provided to transmit electromagnetic radiation of the first wavelength, in particular electromagnetic radiation emitted by first luminous element 12a.

Two further exemplary embodiments of the present invention are shown in FIGS. 3 and 4. The following descriptions and the figures are essentially restricted to the differences between the exemplary embodiments; it is additionally also possible to refer to the drawings and/or the description of the other exemplary embodiments, in particular of FIGS. 1 and 2, with regard to components denoted as identical, in particular with regard to components bearing the same reference numerals. To distinguish the exemplary embodiments, the letter a is appended to the reference numerals of the exemplary embodiment in FIGS. 1 and 2. In the exemplary embodiments of FIGS. 3 and 4, the letter a has been replaced by the letters b and c.

FIG. 3 shows an alternative imaging device 10b, in particular a ToF camera, in a schematic representation. Imaging device 10b preferably includes two luminous elements 12b, 14b, which are designed to emit electromagnetic radiation; an image acquisition element 16b, which is set up to acquire reflected electromagnetic radiation; and a beam splitter unit 18b, which is provided to image at least two different fields of view 20b, 22b onto image acquisition element 16b. Beam splitter unit 18b preferably includes at least one beam splitter element 28b, which is developed as a dichroic mirror, which in order to image the at least two different fields of view 20b, 22b onto image acquisition element 16b, is provided to transmit electromagnetic radiation having a smaller wavelength than a limit wavelength lying between a first wavelength and a second wavelength, and to reflect electromagnetic radiation having a greater wavelength than the limit wavelength. Beam splitter element 28b preferably serves as an edge filter. As an alternative, it is possible that beam splitter unit 18b has a dichroic mirror, which is developed as a separate component and is fixed in place on beam splitter element 28b, is developed as a coating of beam splitter element 28b, or the like. In particular, beam splitter element 28b developed as a dichroic mirror is provided to transmit electromagnetic radiation of the first wavelength, in particular electromagnetic radiation emitted by a first luminous element 12b. In particular, beam splitter element 28b, developed as a dichroic mirror, is provided to reflect electromagnetic radiation of the second wavelength, in particular electromagnetic radiation emitted by a second luminous element 14b.

FIG. 4 shows another alternative imaging device 10c, in particular a ToF camera, in a schematic representation. Imaging device 10c preferably includes two luminous elements 12c, 14c, which are designed to emit electromagnetic radiation; an image acquisition element 16c, which is set up to acquire reflected electromagnetic radiation; and a beam splitter unit 18c, which is provided to image at least two different fields of view 20c, 22c onto image acquisition element 16c. Beam splitter unit 18c is preferably developed as a beam splitter cube, which is provided to image the at least two different fields of view 20c, 22c with viewing angles 34c, 36c smaller than field of view angles 38c, 40c of fields of view 20c, 22c onto image acquisition element 16c. The beam splitter cube is preferably developed in the form of a cube, at least one beam splitter element 28c of beam splitter unit 18c forming a diagonal surface of the beam splitter cube. In particular, image acquisition element 16c is disposed on an inner side surface 58c of the beam splitter cube. The beam splitter cube is preferably developed from a material that is transparent at least to electromagnetic radiation, in particular electromagnetic radiation emitted by a first luminous element 12c, of a first wavelength, and from a material that is transparent at least to electromagnetic radiation, in particular electromagnetic radiation emitted by a second luminous element 14c, of a second wavelength, such as glass, plastic or a similar material. The beam splitter cube may particularly be formed by two prisms 60c, 62c that are glued together, in which case a connecting surface 64c of prisms 60c, 62c forms beam splitter element 28c of beam splitter unit 18c. Luminous elements 12c, 14c are preferably disposed outside the beam splitter cube. In particular, luminous elements 12c, 14c have main emission directions 24c, 26c that are transversely aligned, in particular aligned at a right angle relative to each other.

A material of the beam splitter cube preferably has a higher optical refractive index than an environment of imaging device 10c, in particular air. The beam splitter cube is preferably provided to refract the reflected radiation coming from outside the beam splitter cube when it enters the beam splitter cube, in particular in the direction of an optical axis 66c. The beam splitter cube is preferably provided to image the two fields of view 20c, 22c onto image acquisition element 16c as a function of a refraction of the reflected electromagnetic radiation with imaging angles 34c, 36c that are smaller than field of view angles 38c, 40c of fields of view 20c, 22c. The beam splitter cube is particularly provided to image the two fields of view 20c, 22c onto image acquisition element 16c using image angles 34c, 36c relative to field of view angles 38c, 40c of fields of view 20c, 22c that become smaller the higher the optical refractive index of the beam splitter cube.

What is claimed is:

1. An imaging device, comprising:
   luminous elements which are configured to emit electromagnetic radiation having a first wavelength and a second wavelength;
   at least one image acquisition element set up to acquire, in alternation, at least one image of the first wavelength of the electromagnetic radiation reflected within at least one first field of view, and at least one image of the second wavelength of the electromagnetic radiation reflected within at least one second field of view in each case; and
   at least one beam splitter unit configured to image the reflected electromagnetic radiation in the at least one first field of view and the at least one second field of view onto the image acquisition element, the beam splitter unit being configured to transmit at least the first wavelength of the electromagnetic radiation from a first one of the luminous elements, and to reflect, away from a second one of the luminous elements, at least the second wavelength of the electromagnetic radiation from the second one of the luminous elements;
   wherein the imaging device is configured to acquire a distance measurement in its environment.

2. The imaging device as recited in claim 1, wherein the imaging device is a time-of-flight camera.

3. The imaging device as recited in claim 1, wherein the luminous elements include at least two luminous elements which define the at least two different fields of view to be imaged by the beam splitter unit through emission of electromagnetic radiation that differs at least in its wavelength.

4. The imaging device as recited in claim 3, wherein the beam splitter unit is configured to align main emission directions of the two luminous elements at an angle at a right angle with respect to each other.

5. The imaging device as recited in claim 3, wherein the luminous elements are configured to emit different monochromatic electromagnetic radiation relative to one another.

6. The imaging device as recited in claim 1, wherein the beam splitter unit includes at least one beam splitter element on which at least one bandpass filter element is situated on a side facing away from the image acquisition element for the imaging of at least one first field of view onto the image acquisition element, the bandpass filter element being configured to transmit electromagnetic radiation in a spectral range around the first wavelength.

7. The imaging device as recited in claim 5, wherein to image at least one second field of view onto the image acquisition element, at least one reflector element is situated on a side facing the image acquisition element, the reflector element being configured to reflect electromagnetic radiation in a spectral range around the second wavelength.

8. The imaging device as recited in claim 7, wherein the reflector element is configured to electromagnetic radiation outside the spectral range around the second wavelength.

9. The imaging device as recited in claim 1, wherein the beam splitter unit includes at least one beam splitter element configured as a dichroic mirror, which, to image the at least two different fields of view onto the image acquisition element, is configured to transmit electromagnetic radiation of a smaller wavelength than a limit wavelength lying between the first and the second wavelength, and to reflect electromagnetic radiation having a greater wavelength than the limit wavelength.

10. The imaging device as recited in claim 1, wherein the beam splitter unit is a beam splitter cube configured to image the at least two different fields of view onto the image acquisition element using viewing angles that are smaller than field of view angles of the fields of view.

11. An autonomous device, comprising:
at least one imaging device including:
luminous elements which are configured to emit electromagnetic radiation having a first wavelength and a second wavelength;
at least one image acquisition element set up to acquire, in alternation, at least one image of the first wavelength of the electromagnetic radiation reflected within at least one first field of view, and at least one image of the second wavelength of the electromagnetic radiation reflected within at least one second field of view in each case; and
at least one beam splitter unit configured to image the reflected electromagnetic radiation in the at least one first field of view and the at least one second field of view onto the image acquisition element, the beam splitter unit being configured to transmit at least the first wavelength of the electromagnetic radiation from a first one of the luminous elements, and to reflect, away from a second one of the luminous elements, at least the second wavelength of the electromagnetic radiation from the second one of the luminous elements;
wherein the imaging device is configured to acquire a distance measurement in its environment.

12. The autonomous device as recited in claim 11, further comprising:
at least one electronics unit configured to actuate a least one drive unit of the autonomous device as a function of at least one signal from the imaging device.

* * * * *